UNITED STATES PATENT OFFICE.

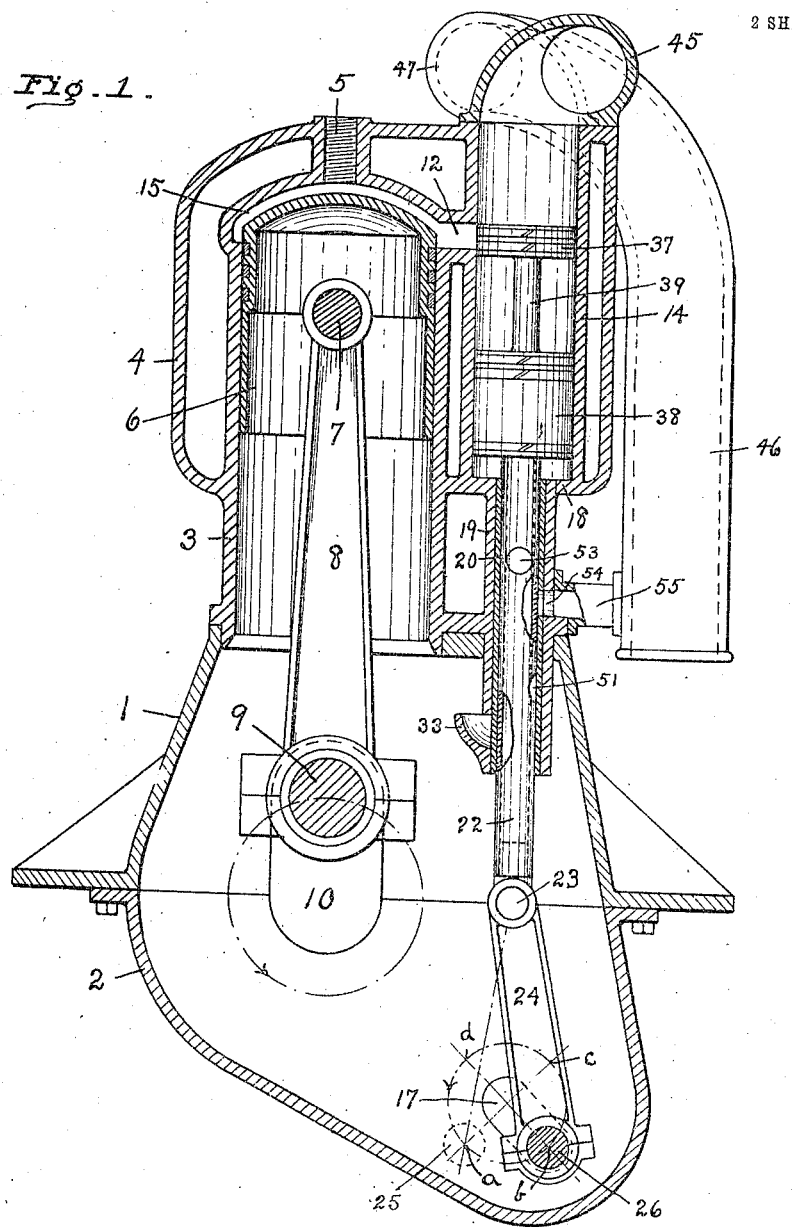

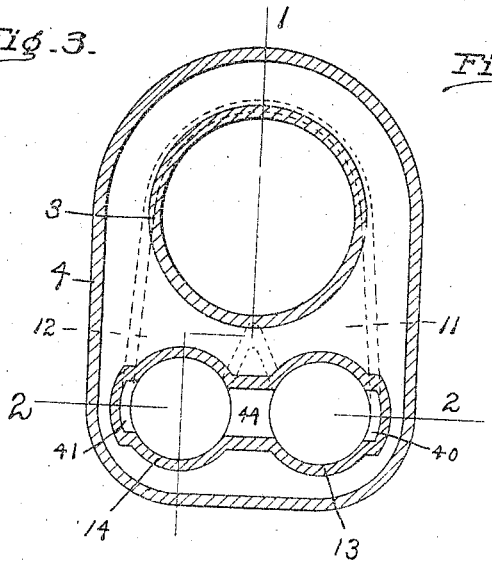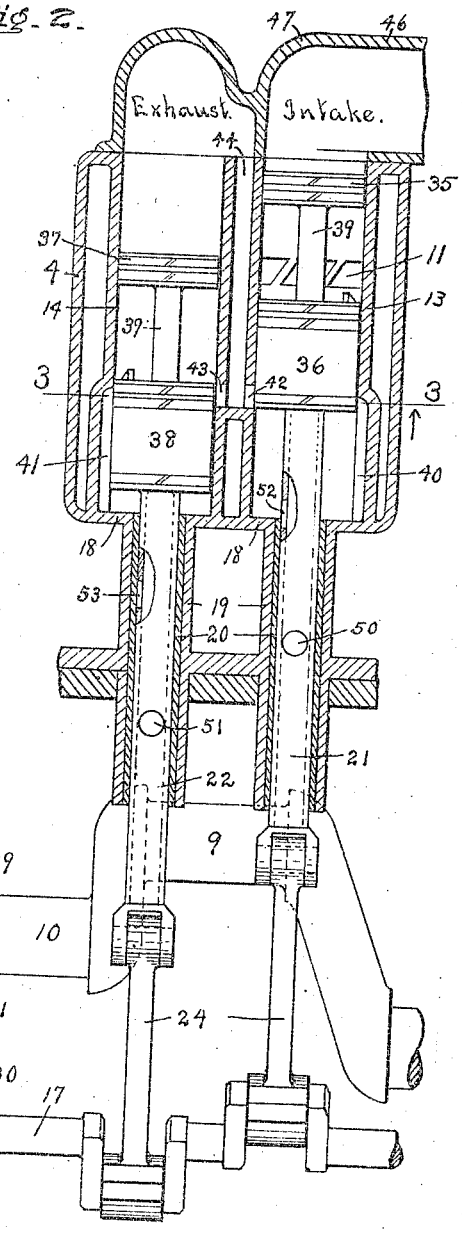

ARTHUR M. LAYCOCK, OF DETROIT, MICHIGAN.

INTERNAL-COMBUSTION ENGINE.

1,038,767.  Specification of Letters Patent.  Patented Sept. 17, 1912.

Application filed November 27, 1911. Serial No. 662,552.

*To all whom it may concern:*

Be it known that I, ARTHUR M. LAYCOCK, a subject of the King of Great Britain, and a resident of Detroit, in the county of Wayne and State of Michigan, have invented a new and useful Internal-Combustion Engine, of which the following is a specification.

This invention relates to four-cycle internal-combustion engines, and its object is to provide a valve mechanism for engines of this type which shall effectively control the admission and exhaust, which shall operate noiselessly, and which shall conduce to the obtaining of maximum efficiency.

This invention consists in combination with the cylinder of an internal-combustion engine provided with intake and exhaust ports at its outer end, of cylindrical valve chambers fitted with piston valves of the "dumb-bell" type, so constructed that the spaces between the two parts of both valves will serve as the explosion chamber of the engine.
It further consists in so constructing the cylinder and the valve chambers that the scavenging of the cylinders and valve chambers will be practically perfect.

In the accompanying drawings Figure 1 is a vertical section on the line 1—1 of Fig. 3. Fig. 2 is a vertical section on the line 2—2 of Fig. 3. Fig. 3 is a horizontal section on the line 3—3 of Fig. 2. Fig. 4 is a horizontal section similar to Fig. 3, of a T-head type of engine.

Similar reference characters refer to like parts throughout the several views.

In this engine, the crank-case is shown formed of two parts, 1 and 2, but the invention is not dependent upon any particular form of crank-case. Mounted on the crank-case is the cylinder 3 having a water-jacket 4 of any desired form, and a threaded aperture 5 for the spark plug. A piston 6 is slidable in the cylinder and has a pin 7 which passes through the upper end of the connecting rod 8. The lower end of the connecting rod embraces the crank-pin 9 of the crank-shaft 10. The engine is pro-
vided at its upper end with an intake port 11 and an exhaust port 12. Adjacent the cylinder are the cylindrical valve chambers 13 and 14, surrounded by the water-jacket 4.

One object in the construction of this engine is to reduce the space between the cylinder-head and the piston when the latter is at the upper end of its stroke, and to shorten the exhaust and intake ports, and thus reduce to a minimum the space which may be occupied by burnt gases after the cylinder has been scavenged. The space 15 between the piston and the cylinder-head need only be about $\frac{1}{16}$ of an inch, that is, sufficiently large to contain enough explosive mixture to carry a flame, although it is shown larger in proportion in the drawings.

In order to shorten the intake and exhaust ports the central lines of the valve chambers and of the cylinder may diverge downwardly, which may be the case when the cam-shaft and the crank-shaft are necessarily at such distance from each other that should the central lines of the valve chambers and the cylinder be parallel to each other, the intake and exhaust passages would become undesirably long. In the present case the cam-shaft 17 is mounted so far below the crank-shaft that the valve chambers and the cylinder may be parallel to each other. But I do not wish to be limited to this construction, as it may be found desirable to locate the valve chambers otherwise, which may easily be done while still preserving my principles.

The valve chambers are formed with bottom heads 18, from which the sleeves 19 extend downwardly and are preferably lined with anti-friction tubes 20. Within these tubes are slidable the valve-stems 21 and 22, which have pins 23 at their lower ends which receive the upper ends of the links 24, mounted on the crank-pins 25—26 of the cam-shaft 17. Any desired means may be employed to drive the cam-shaft. If desired, the crank-shaft 10 may be provided with a sprocket wheel 29 of any desired construction, which is connected to the sprocket wheel 30 on the cam-shaft by means of a chain 31. The sprocket wheels 29 and 30 will be of such size that the cam-shaft will run at one-half the speed of the crank-shaft, as is usual in four-cycle engines. The sleeves 19 may be formed with oil-cups 33, by means of which the valve-stems 21 and 22 may be lubricated. The valves are alike, each having an upper and a lower operative portion provided with rings in the usual manner. These are lettered 35 and 36 in the intake valve, and 37 and 38 in the exhaust valve. The two parts of each valve are connected by a stem 39. Each chamber is formed with a by-pass 40—41 and a small port 42—43 opening into a passage 44 which connects to the exhaust pipe 45.

A fuel pipe 46 connects at its lower end to a carbureter and forms a hood 47 which extends over the open end of the intake-valve chamber 13, and preferably integral with the exhaust connection 45. The valve-stems are formed with ports 50—51, and 52—53. Both sleeves 19 are formed with passages 54 which may open into the Y connection 55 which connects to the fuel pipe 46. If desired, this pipe 55 may be omitted so that instead of explosive mixture, fresh air will pass through the openings 54.

Fig. 1 shows the engine at the end of the scavenging stroke with the piston about to move downwardly and the exhaust valve moving upwardly, the crank-shaft and the cam-shaft both turning to the left, the cam-shaft turning at one-half the speed of the crank-shaft. The exhaust port is shown closed by the outer part 37 of the exhaust valve. The space between the parts 37 and 38 may be filled with explosive mixtures as hereinafter described. As the piston makes its down or charging stroke, the exhaust valve moves up and prevents any circulation through the port 12. The dotted lines crossing each other at right angles at the center of the cam-shaft cross the path of the pins 25—26 at the points $a$, $b$, $c$ and $d$, the pin 25 of the intake valve being shown in dotted lines. The pins 25 and 26 are ninety degrees apart. When the piston is in the position shown in Fig. 1, both valves are at the same height, but while the piston is going down, the intake valve is moving down, while the exhaust valve is moving up owing to the movement of their pins 25 and 26. At the end of the charging stroke, the exhaust valve will be at the height of the intake valve in Fig. 2 and the intake valve will be at the height of the exhaust valve in Fig. 1. The pin 26 will be at $c$ and the pin 25 at $b$. During the first half of the compression stroke the exhaust valve will travel to the upper end of its stroke, increasing the vacuum below the part 38, which space will be filled when the port 51 registers with the opening 54, at which time, explosive mixture will rush in through the pipe 55, up through the hollow valve-stem, and out through the port 53 into this space below the valve piston 38. At the completion of the compression stroke, both valves will be at the height in which the intake valve is shown in Fig. 2, the pin 26 being at $d$ and the pin 25 at $c$, and the explosion will occur. The explosive mixture fills the narrow space between the piston and the cylinder-head, the intake and exhaust passages, and the spaces between the upper and lower portions of the two valves. As the areas of the two parts of the valves are equal, no undue strain will come on the pins 23 because of the pressure of the explosion. During the working stroke of the engine, the exhaust valve will slowly move to the position shown in Figs. 1 and 2, while the intake valve will move from the position in which it is shown in Fig. 2 to the upper end of its stroke and then back to the height in which it is there shown, the pin 26 moving from $d$ to $a$ and the pin 25 from $c$ to $d$. It will thus be seen that during the entire working stroke of the piston, the spaces between the two parts of both valves are in communication with the bore of the cylinder, so that the expanding gases may rush into the cylinder from the valve chambers. At the end of the working stroke both valves are moving downward, the exhaust valve to uncover the exhaust port, which it leaves uncovered during the scavenging stroke, that is, while the pin 26 moves from $a$ to $b$. During this time, however, the intake valve is moving from the height in which it is shown in Fig. 2 to the height in which the exhaust valve is shown, the pin 25 moving from $d$ to $a$, during which time the intake port 11 is closed. This completes the cycle of the engine.

As before stated, when a valve rises, a charge of explosive mixture is drawn into the space below its lower portion, and when the valve descends, the port 52—53 soon becomes closed. The charge below the part 36 becomes compressed in the by-pass 40 until the top of the lower portions of the piston 36 passes below the upper end of the by-pass. At that instant the compressed charge will flow up through this by-pass and enter the space between the two parts of the valve, forcing out the burnt gases through the port 42 into the passage 44. The action is similar to the operation of a two-cycle engine and results in the space between the two parts of each valve being scavenged and filled with an explosive mixture. In case it is not desired to use an explosive mixture at this point, the pipe 55 may be removed and fresh air permitted to move in the same path, in which case the explosive mixture drawn into the cylinder should be somewhat richer, so that when it mingles with the uncharged air in the space between the two parts of the valves, a proper explosive mixture will result.

Instead of having both valves on one side of the cylinder it will be evident that they can be spaced in any other desired manner. In Fig. 4 a T-head construction is shown which comprises a cylinder 5, water-jacket 52, and valve-chambers 53 and 54. Each valve-chamber has a by-pass 55 corresponding to the by-pass 40 just described, and a passage 56 through which the burnt gases between the two parts of the valve may escape.

The proportions and details of construction of this engine may be changed by skilled engineers without departing from the spirit of my invention.

I claim:

1. In an internal-combustion engine, the combination of a cylinder, a piston therein, a valve-chamber adjacent said cylinder and connected thereto by a port, said chamber provided with an inlet port at its lower end for the admission of air, an exhaust port intermediate its ends for the exhaust of the air, and a by-pass in its wall, a valve movable in said chamber and formed of two parts so as to constitute a receptacle for the compressed explosive mixture at the time of the explosion, the lower part of the valve controlling the passage of air through said by-pass and exhaust port of the valve chamber to cause scavenging of said receptacle for the explosive mixture.

2. In an internal-combustion engine, the combination of a cylinder, a piston therein, a valve-chamber adjacent said cylinder and connected thereto by a port, the lower end of said valve-chamber forming a compression chamber having a by-pass in its wall and a port opposite the upper end of the by-pass, a valve in said chamber formed of two cylindrical parts, means to so position the valve that the space between its parts will be opposite the cylinder port during the working stroke of the piston, and to so move the valve that said space will be in line with the upper end of the by-pass and the port opposite the same so said space may be scavenged after each explosion.

3. In an internal-combustion engine, the combination of a cylinder, two cylindrical valve-chambers adjacent thereto and connected thereto by ports, a valve movable in each chamber and comprising two connected pistons, a hollow stem for each valve, a guide therefor having an aperture registering with a port in said stem when at the upper end of said stroke, said stem having a second port which opens into the lower end of the valve chamber when the stem is at the upper end of its stroke, and means to actuate said valves.

4. In an internal-combustion engine, the combination of a cylinder, two cylindrical valve-chambers adjacent thereto and connected thereto by ports, a valve movable in each chamber and comprising two connected pistons, a hollow stem for each valve, a guide therefor having an aperture registering with a port in said stem when at the upper end of said stroke, said stem having a second port which opens into the lower end of the valve chamber when the stem is at the upper end of its stroke, and means to actuate said valves, each valve-chamber having a by-pass in its wall to permit communication around the lower valve-piston when at the lower end of its stroke, and an exhaust passage which is opened by said lower piston when at such lower end of its stroke.

5. In an internal-combustion engine, the combination of a cylinder, two cylindrical valve-chambers adjacent thereto and connected thereto by ports, an exhaust pipe connected to the outer end of one chamber, a fuel-supply pipe connected to the outer end of the other chamber, a valve in each chamber formed of two pistons connected by a stem, each valve-chamber having a by-pass in its wall to permit communication around the lower valve-piston when at the lower end of its stroke, and an exhaust passage which is opened by said lower piston when at such lower end of its stroke.

6. In an internal-combustion engine, the combination of a cylinder, two cylindrical valve chambers adjacent thereto and connected thereto by ports, an exhaust pipe connected to the outer end of one chamber, a fuel-supply pipe connected to the outer end of the other chamber, a cylindrical valve in each chamber formed of two connected pistons, the outer piston of each valve movable inwardly beyond its respective port, and means to so position the valves that the space between the parts of each will be opposite its port during the compression and explosion of the fuel in the cylinder.

7. In an internal-combustion engine, the combination of a cylinder, a valve-chamber adjacent thereto and connected thereto by a port, a valve movable in said chamber, a hollow stem for the valve having a lateral opening at such a distance from the valve that it will communicate with the valve-chamber when the stem is at the upper end of its stroke to admit air into the valve-chamber.

8. In an internal-combustion engine, the combination of a cylinder, a valve-chamber adjacent thereto and connected thereto by a port, a valve movable in said chamber, a hollow stem for the valve having a lateral opening at such a distance from the valve that it will communicate with the valve-chamber when the stem is at the upper end of its stroke to admit air into the valve-chamber, said valve-chamber having a passage in its wall whereby air may escape from the lower end of the valve-chamber when the valve reaches the lower end of its stroke.

In testimony whereof I have signed this specification in the presence of two subscribing witnesses.

ARTHUR M. LAYCOCK.

Witnesses:
　LAURA D. LAYCOCK,
　EDWARD N. PAGELSEN.